US009493672B2

United States Patent
Song et al.

(10) Patent No.: US 9,493,672 B2
(45) Date of Patent: Nov. 15, 2016

(54) COATING MATERIAL FOR ALUMINUM SUBSTRATE FOR INKJET COMPUTER-TO-PLATE AND PREPARATION AND USE OF SAME

(75) Inventors: Yanlin Song, Beijing (CN); Ming Yang, Beijing (CN); Haihua Zhou, Beijing (CN); Lianming Yang, Beijing (CN); Gang Li, Beijing (CN)

(73) Assignee: Institute of Chemistry, Chinese Academy of Sciences, Beijing (CN)

( * ) Notice: Subject to any disclaimer, the term of this patent is extended or adjusted under 35 U.S.C. 154(b) by 55 days.

(21) Appl. No.: 14/232,610

(22) PCT Filed: Jul. 12, 2012

(86) PCT No.: PCT/CN2012/078554
§ 371 (c)(1),
(2), (4) Date: Jul. 22, 2014

(87) PCT Pub. No.: WO2013/007203
PCT Pub. Date: Jan. 17, 2013

(65) Prior Publication Data
US 2014/0356532 A1 Dec. 4, 2014

(30) Foreign Application Priority Data

Jul. 13, 2011 (CN) .......................... 2011 1 0196393

(51) Int. Cl.
| | |
|---|---|
| C09D 161/06 | (2006.01) |
| B05D 5/02 | (2006.01) |
| C09D 105/00 | (2006.01) |
| C09D 161/24 | (2006.01) |
| C09D 163/00 | (2006.01) |
| C09D 175/04 | (2006.01) |
| C09D 7/12 | (2006.01) |
| C09D 133/10 | (2006.01) |
| C09D 167/06 | (2006.01) |
| C09D 133/02 | (2006.01) |
| C09D 131/04 | (2006.01) |
| C09D 167/00 | (2006.01) |
| B05D 3/02 | (2006.01) |
| B05D 1/28 | (2006.01) |
| B05D 1/00 | (2006.01) |
| C08K 3/22 | (2006.01) |
| C08K 3/36 | (2006.01) |
| C08K 5/05 | (2006.01) |
| C08K 5/06 | (2006.01) |
| C08K 5/101 | (2006.01) |

(52) U.S. Cl.
CPC ............... *C09D 161/06* (2013.01); *B05D 5/02* (2013.01); *C09D 7/1216* (2013.01); *C09D 7/1266* (2013.01); *C09D 7/1275* (2013.01); *C09D 105/00* (2013.01); *C09D 131/04* (2013.01); *C09D 133/02* (2013.01); *C09D 133/10* (2013.01); *C09D 161/24* (2013.01); *C09D 163/00* (2013.01); *C09D 167/00* (2013.01); *C09D 167/06* (2013.01); *C09D 175/04* (2013.01); *B05D 1/005* (2013.01); *B05D 1/28* (2013.01); *B05D 3/0254* (2013.01); *C08K 3/22* (2013.01); *C08K 3/36* (2013.01); *C08K 5/05* (2013.01); *C08K 5/06* (2013.01); *C08K 5/101* (2013.01); *C08K 2003/2213* (2013.01); *C08K 2003/2227* (2013.01); *C08K 2003/2241* (2013.01); *C08K 2003/2296* (2013.01)

(58) Field of Classification Search
CPC .......... B05D 5/02; B05D 1/005; B05D 1/28; B05D 3/0254; C09D 161/06; C09D 133/02; C09D 163/00; C09D 175/04; C09D 167/00; C09D 105/00; C09D 161/24; C09D 131/04; C08K 3/22
See application file for complete search history.

(56) References Cited

U.S. PATENT DOCUMENTS

| 8,062,720 B1 * | 11/2011 | Porat et al. ................. 428/32.26 |
| 2005/0049352 A1 * | 3/2005 | Rubinsztajn .......... B82Y 30/00 524/492 |

(Continued)

FOREIGN PATENT DOCUMENTS

| CN | 85100875 A | 8/1986 |
| CN | 1295307 A | 5/2001 |

(Continued)

OTHER PUBLICATIONS

PCT International Search Report for PCT Counterpart Application No. PCT/CN2012/078554, 8 pgs., (Nov. 8, 2012).
PCT Chapter I International Preliminary Report on Patentability (IPRP Chapter I) for PCT Counterpart Application No. PCT/CN2012/078554, 9 pgs., (Jan. 14, 2014).

*Primary Examiner* — Kirsten Jolley
(74) *Attorney, Agent, or Firm* — Blakely, Sokoloff, Taylor & Zafman LLP

(57) ABSTRACT

A coating material for an aluminum substrate for inkjet computer-to-plate and preparation method and use of same. The composition of the coating material is: high polymer 5-40 wt %; nano-sized and/or micro-sized oxide particles 5-30 wt %; organic solvent constituting the remainder. The high polymer is at least one selected from the group consisting of MMA-BMA-MA terpolymer resin, phenolic resin, epoxy resin, polyurethane, polyester, urea-formaldehyde resin, polyvinyl formal, polyvinyl butyral and gum arabic. The preparation method for obtaining the coating material is to mix the ingredients together and stir at room temperature. A spin coating method or a roll coating method is used to coat the coating material onto a clean aluminum substrate having not undergone electrolytic graining and anodic oxidation treatment, and then the substrate is baked, resulting in the required roughness.

6 Claims, No Drawings

(56) References Cited

U.S. PATENT DOCUMENTS

| | | | |
|---|---|---|---|
| 2008/0221009 A1 | 9/2008 | Kanagasabapathy et al. | |
| 2012/0021129 A1* | 1/2012 | Zhou | B41N 3/036 |
| | | | 427/292 |
| 2012/0285342 A1* | 11/2012 | Adelman | B41C 1/045 |
| | | | 101/401 |

FOREIGN PATENT DOCUMENTS

| | | |
|---|---|---|
| CN | 101063014 A | 10/2007 |
| CN | 101397438 A | 4/2009 |
| CN | 101397438 A | 4/2009 |
| CN | 101418157 A | 4/2009 |
| CN | 101747683 A | 6/2010 |
| CN | 101954775 A | 1/2011 |
| CN | 102102214 A | 6/2011 |
| JP | 57049674 A | 3/1982 |
| JP | 2004314321 A | 11/2011 |
| JP | 2008030474 A | 2/2014 |
| WO | WO0145959 A1 | 6/2001 |

* cited by examiner

COATING MATERIAL FOR ALUMINUM SUBSTRATE FOR INKJET COMPUTER-TO-PLATE AND PREPARATION AND USE OF SAME

CROSS-REFERENCE TO RELATED APPLICATIONS

This patent application is a U.S. National Phase Application under 35 U.S.C. §371 of International Application No. PCT/CN2012/078554, filed Jul. 12, 2012, entitled COATING MATERIAL FOR ALUMINUM SUBSTRATE FOR INKJET COMPUTER-TO-PLATE AND PREPARATION AND USE OF SAME, which claims priority to Chinese Patent Application No. 201110196393.4, filed Jul. 13, 2011.

FIELD OF THE INVENTION

The present invention pertains to the field of printing plate, and relates to an aluminum substrate with good abrasive resistance and ink-receptivity, in particular to a coating material for aluminum substrate for inkjet computer-to-plate and preparation method and use of the same.

BACKGROUND OF THE INVENTION

Inkjet computer-to-plate (CTP) technique is a technique that utilizes an inkjet printing apparatus to spray images directly on printed substrates. At present, the printed substrate is mainly applied with aluminum substrate. In order to improve the durability and resolution of the aluminum substrate, the aluminum plate is usually undergone anodic oxidation and graining treatment to form a certain degree of roughness on its surface (see CN85100875A). In the process of anodic oxidation treatment, the aluminum plate is necessarily pretreated with a large quantity of acid and alkali, while the waste liquid of acid and alkali is not only prone to cause relatively serious environmental pollution, but also increase overall manufacturing cost of the finished substrate. CN1295307A discloses that water-soluble natural polymer and water-soluble synthesized polymer are applied on the image receiving layer, but the aluminum substrate still needs a treatment of anodic oxidation.

The main object of the present invention is to add nano-size and/or micron-size oxide particle into polymer, then apply the obtained coating material on surface of a aluminum plate, so as to form a certain degree of roughness on the surface of the aluminum plate, thereby avoid an anodic oxidation treatment and protect environment.

SUMMARY OF THE INVENTION

The first object of the present invention is to provide a coating material for aluminum substrate for inkjet computer-to-plate, such that the aluminum substrate with the coating material can substitute the aluminum substrate which has undergone graining and anodic oxidation treatment, and can possess similar performance with the grained and anodized aluminum substrate, thereby achieve the aim of preventing the waste liquid of acid and alkali produced in the process of anodic oxidation from polluting environment.

The second object of the present invention is to provide a preparation method for the coating material for aluminum substrate for inkjet computer-to-plate.

The third object of the present invention is to provide use of the coating material for aluminum substrate for inkjet computer-to-plate.

The present invention aims to avoid electrolytic graining and anodic oxidation treatment, at the same time to make the resulted aluminum substrate possess similar performance with the grained and anodized aluminum substrate by means of applying surface of the aluminum plate with a coating material comprising polymer and nano-size and/or micron-size oxide particle. In the present invention, the nano-size and/or micron-size oxide particles are attached to the surface of the aluminum plate by using the adhesive property of the polymer, so as to form an appropriate roughness on the surface of the aluminum plate, the obtained aluminum substrate is beneficial to absorption of ink and water retentivity, thereby avoid the environmental pollution triggered by the process of anodic oxidation treatment.

The present invention provides a coating material for aluminum substrate for inkjet computer-to-plate, based on total weight of the coating material, comprising:

| | |
|---|---|
| polymer | 5-40 wt % |
| nano-size and/or micron-size oxide particle | 5-30 wt % |
| organic solvent | balance. |

The polymer may be various commonly used polymers which can play a role of adhesion and forming film. Preferably, the polymer can be at least one selected from the group consisting of a copolymer of methyl methacrylate, butyl methacrylate and methacrylic acid (which may be a random copolymer or a block copolymer, and is referred to as MMA-BMA-MA copolymer hereinafter), phenolic resin, epoxy resin, polyurethane, polyester, urea-formaldehyde resin, polyvinyl formal, polyvinyl butyral and gum arabic.

There is no special restriction on the content of each of structural units in the MMA-BMA-MA copolymer; it may be a conventional choice in the art. Generally, in the MMA-BMA-MA copolymer resin, the weight ratio of the structural unit derived from methyl methacrylate, the structural unit derived from butyl methacrylate and the structural unit derived from methacrylic acid may be in a range of 1:1-10:1-10. There is no special restriction on the molecular weight of the MMA-BMA-MA copolymer either, provided that the MMA-BMA-MA copolymer can play a role of adhesion and forming film.

Preferably, the phenolic resin is novolac resin.

The epoxy resin may be various epoxy resin commonly used in the field without any restriction. For example, the epoxy resin may be glycidyl ether epoxy resin, glycidyl ester epoxy resin, glycidyl amine epoxy resin, linear aliphatic epoxy resin or cycloaliphatic epoxy resin.

The polyester may be various polyesters commonly used in the field. For example, the polyester can be at least one selected from saturated polyester resin and unsaturated polyester resin.

The polyurethane may be various resins commonly used in the field obtained by condensation of isocyanate and compound with hydroxyl groups, wherein, the isocyanate and the compound with hydroxyl groups may be conventional choice in the field. For instance, the isocyanate can be at least one selected from the group consisting of toluene diisocyanate, isophorone diisocyanate, para-phenylene diisocyanate, methyl cyclohexyl diisocyanate and 1,4-cyclohexane diisocyanate. The compounds with hydroxyl groups can be at least one selected from the group consisting of polycarbonate diol, polyether triol, polyether diol (e.g., polyoxypropylene glycol, polyoxybutylene glycol, polypropylene glycol, and polyethylene glycol), polyester diol and polyacrylate polyol.

The nano-size and/or micron-size oxide particle has an average particle size in a range of 5 nm to 3,000 nm. The average particle size is an average particle size by volume and is measured by Winner 2000 ZD type laser particle analyzer commercially available from Jinan Winner Particle Technology Co., Ltd.

The oxide is at least one selected from the group consisting of zinc oxide, alumina, titania, silica, cadmium oxide, ceria and zirconium oxide.

The organic solvent is at least one selected from the group consisting of ester, acetone, butanone, methanol, ethanol, 1-propanol, 2-propanol, 2-butanol, 2-methyl-2-propanol, alkane (e.g., linear alkane or cycloalkane with 5 to 20 carbon atoms), toluene, ethylene glycol monoethyl ether, ethylene glycol methyl ether (e.g., ethylene glycol monomethyl ether and ethylene glycol dimethyl ether), propylene glycol methyl ether (e.g., propylene glycol monomethyl ether and propylene glycol dimethyl ether), diethyl ether, N-methyl pyrrolidone and tetrahydrofuran.

The ester is at least one selected from the group consisting of methyl acetate, ethyl formate, propyl formate (e.g., isopropyl formate), ethyl acetate and butyl acetate (e.g., n-butyl acetate).

The alkane is at least one selected from the group consisting of n-heptane, n-hexane, n-pentane and cyclohexane.

The present invention also provides a preparation method of the coating material for aluminum substrate for inkjet computer-to-plate, comprising the following steps: based on total weight of the coating material, mixing the polymer in an amount of 5-40 wt %, the nano-size and/or micron-size oxide particle in an amount of 5-30 wt % and the organic solvent in balance with stirring at room temperature, so as to obtain the coating material.

The present invention further provides use of the coating material for aluminum substrate for inkjet computer-to-plate, comprising applying the coating material according to the present application onto surface of a clean (may be rinsed with acetone and water) aluminum plate having not undergone electrolytic graining and anodic oxidation treatment by spin coating or roll coating, followed by baking, so as to make the surface of the aluminum plate have a certain roughness. There is no special restriction on the conditions of baking, provided that the coating material of the present invention can form a coating layer with adhesion force sufficient to satisfy operating requirements on the surface of the aluminum plate.

The coating material of the present invention has advantages of inexpensive raw material and simple preparation method. By using the coating material of the present invention, the environmental pollution caused by the waste liquid of acid and alkali produced in the process of anodic oxidation can be avoided. When the coating material of the present invention is directly applied on the surface of the aluminum plate by spin coating or roll coating, the obtained aluminum substrate possesses desirable ink absorbency and water retentivity, and thus can be directly used for inkjet computer-to-plate process; therefore, the step of post-processing is saved. The adhesion force between the coating material of the present invention and the aluminum plate is good. The surface of aluminum plate applied with the coating material of the present invention shows high specific surface energy due to the presence of nano-size and/or micron-size oxide particles in the coating material, as a result, both the demand of ink absorbency and the demand of the environmental protection are satisfied. In addition, the surface of the aluminum substrate with the coating material of the present invention has good abrasion resistance and shows a hydrophilicity close to or superior than that of ordinary PS substrates as indicated by observing the contact angle of water drop on the surface of the coating layer, thereby avoid the environmental pollution triggered by the process of anodic oxidation treatment.

DETAILED DESCRIPTION OF THE EMBODIMENTS

EXAMPLE 1

Based on the total weight of the coating material, mixing phenolic resin in an amount of 5 wt % (Model 2123, commercially available from Liaoning Province Star Harbor Friction Materials Co., Ltd.), zinc oxide (having an average particle size of 3,000 nm) in an amount of 30 wt % and ethylene glycol monoethyl ether in balance with stirring at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of spin coating, followed by baking, so as to make the surface of the aluminum plate have a required roughness, thereby obtain the aluminum substrate.

EXAMPLE 2

Based on the total weight of the coating material, mixing phenolic resin in an amount of 40 wt % (Model 2402, commercially available from Qingdao Dechen Chemical Co., Ltd.), alumina (having an average particle size of 5 nm) in an amount of 30 wt % and propylene glycol methyl ether in balance with stiffing at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of spin coating, followed by baking, so as to make the surface of the aluminum plate have a required roughness, thereby obtain the aluminum substrate.

EXAMPLE 3

Based on the total weight of the coating material, mixing MMA-BMA-MA copolymer resin in an amount of 25 wt % (which is commercially available from Xi'an Organic Chemical Industry Plant and is a random copolymer with a solid content of 35 wt % and a viscosity of 45 s by a Tu-4 cup viscometer under a temperature of 25° C. according to the method provided in National Standard GB/T 1723-93 of China, wherein the weight ratio of the structural unit derived from methyl methacrylate, the structural unit derived from butyl methacrylate and the structural unit derived from methacrylic acid is 1:1:5), zinc oxide (having an average particle size of 200 nm) in an amount of 15 wt % and ethyl acetate in balance with stirring at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of roll coating, followed by baking, so as to make the surface of the aluminum plate have a required roughness, thereby obtain the aluminum substrate.

EXAMPLE 4

Based on the total weight of the coating material, mixing MMA-BMA-MA copolymer resin in an amount of 15 wt % (which is commercially available from Xi'an Organic Chemical Industry Plant and is a random copolymer with a solid content of 28 wt % and a viscosity of 30 s by a Tu-4 cup viscometer under a temperature of 25° C. according to the method provided in National Standard GB/T 1723-93 of China, wherein the weight ratio of the structural unit derived from methyl methacrylate, the structural unit derived from butyl methacrylate and the structural unit derived from methacrylic acid is 1:4:2), silica (having an average particle size of 500 nm) in an amount of 10 wt % and n-butyl acetate in balance with stiffing at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of roll coating, followed by baking, so as to make the surface of the aluminum plate have a required roughness, thereby obtain the aluminum substrate.

EXAMPLE 5

Based on the total weight of the coating material, mixing epoxy resin in an amount of 20 wt % (Model 815, commercially available from Zhongshan City Sanxiang Township Vpro Resin Material Trading Firm), titania (having an average particle size of 300 nm) in an amount of 20 wt % and propyl formate in balance with stiffing at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of spin coating, followed by baking, so as to make the surface of the aluminum plate have a required roughness, thereby obtain the aluminum substrate.

EXAMPLE 6

Based on the total weight of the coating material, mixing polyurethane in an amount of 30 wt % (Model WANNATE PM-2025, commercially available from Yantai Wanhua Polyurethane Co., Ltd.), cadmium oxide (having an average particle size of 1,000 nm) in an amount of 15 wt % and N-methyl pyrrolidone in balance with stiffing at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of a roll coating, followed by baking, so as to make the surface of the aluminum plate have a required roughness, thereby obtain the aluminum substrate

EXAMPLE 7

Based on the total weight of the coating material, mixing unsaturated polyester resin in an amount of 40 wt % (Model 902#, commercially available from Jinan Lvzhou Composite Material Co., Ltd.), zirconia (having an average particle size of 500 nm) in an amount of 10 wt % and ethyl acetate in balance with stirring at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of spin coating, followed by baking, so as to make the surface of the aluminum plate have a required roughness, thereby obtain the aluminum substrate.

EXAMPLE 8

Based on the total weight of the coating material, mixing urea-formaldehyde resin in an amount of 15 wt % (commercially available from Jinan Wald Chemical Co., Ltd., the trade name is Beetle), ceria (having an average particle size of 2,000 nm) in an amount of 6 wt % and toluene in balance with stiffing at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of roll coating, followed by baking, so as to make the surface of the aluminum plate have a required roughness, thereby obtain the aluminum substrate.

EXAMPLE 9

Based on the total weight of the coating material, mixing polyvinyl formal in an amount of 20 wt % (which is commercially available from Beijing Chemical Reagent Co., Ltd., with a viscosity in the range of 30-40 s by a Tu-4 cup viscometer under a temperature of 25° C. according to the method provided in National Standard GB/T 1723-93 of China), zinc oxide (having an average particle size of 900 nm) in an amount of 10 wt % and n-heptane in balance with stirring at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of roll coating, followed by baking, so as to make the surface of the aluminum plate have a required roughness, thereby obtain the aluminum substrate.

EXAMPLE 10

Based on the total weight of the coating material, mixing the polyvinyl butyral in an amount of 20 wt % (which is commercially available from Beijing Chemical Reagent Co., Ltd. with a viscosity in the range of 100-120 s by a Tu-4 cup viscometer under a temperature of 25° C. according to the method provided in National Standard GB/T 1723-93 of China), alumina (having an average particle size of 2,000 nm) in an amount of 15 wt % and butanone in balance with stirring at room temperature, and removing the impurities, thereby obtain the coating material.

An aluminum plate having not undergone electrolytic graining and anodic oxidation treatment is successively rinsed with acetone and water, and then the plate is baked. The baked plate is coated with the coating material by means of roll coating, followed by baking, so as to make the surface of the aluminum plate have a required roughness, thereby obtain the aluminum substrate.

EXAMPLE 11

Based on the total weight of the coating material, mixing gum arabic in an amount of 40 wt % (commercially available from Jinan Tongchuang Xinshengyuan Economic & Trade Co., Ltd.), zinc oxide (having an average particle size of 300 nm) in an amount of 5 wt % and ethanol in balance with stiffing at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of roll coating, followed by baking, so as to make the surface of the aluminum plate have a required roughness, thereby obtain the aluminum substrate.

EXAMPLE 12

Based on the total weight of the coating material, mixing MMA-BMA-MA copolymer in an amount of 10 wt % (which is commercially available from Xi'an Organic Chemical Industry Plant and is a random copolymer with a viscosity of 38 s by a Tu-4 cup viscometer under a temperature of 25° C. according to the method provided in National Standard GB/T 1723-93 of China, wherein the weight ratio of the structural unit derived from methyl methacrylate, the structural unit derived from butyl methacrylate and the structural unit derived from methacrylic acid is 1:10:10), epoxy resin in an amount of 10 wt %, alumina (having an average particle size of 100 nm) in an amount of 5 wt % and ethyl formate in balance with stiffing at room temperature, and removing the impurities, thereby obtain the coating material.

An aluminum plate having not undergone electrolytic graining and anodic oxidation treatment is successively rinsed with acetone and water, and then the plate is baked. The baked plate is applied with the coating material by means of roll coating, followed by baking, so as to make the surface of the aluminum plate have a required roughness, thereby obtain the aluminum substrate.

The aluminum substrate as recited in the above-mentioned Examples 1 to 12 can be directly used for printing following plate-making by inkjet computer-to-plate (CTP) process, thereby save the step of post-processing. The adhesion force between the coating material of the present invention and the aluminum plate is good. The aluminum substrate obtained by applying the aluminum plate with the coating material of the present invention can meet the demands of ink absorbency and environmental protection, the surface of which has a good abrasion resistance with a durability up to 50,000 copies.

What is claimed is:

1. A method for preparing an aluminum substrate for inkjet computer-to-plate, comprising applying coating material onto surface of a clean aluminum plate having not undergone electrolytic graining and anodic oxidation treatment by spin coating or roll coating, followed by baking, so as to make the surface of the aluminum plate have a required roughness, based on total weight of the coating material, the coating material consists of:

| polymer | 5-40 wt % |
| nano-size and/or micron-size oxide particle | 5-30 wt % |
| organic solvent | balance | the polymer is at least one selected from the group consisting of novolac resin, epoxy resin, polyester, and urea-formaldehyde resin.

2. The method according to claim 1, wherein the nano-size and/or micron-size oxide particle has an average particle size in a range of 5 nm to 3,000 nm.

3. The method according to claim 1, wherein the oxide is at least one selected from the group consisting of zinc oxide, alumina, titania, silica, cadmium oxide, ceria and zirconium oxide.

4. The method according to claim 1, wherein the organic solvent is at least one selected from the group consisting of ester, acetone, butanone, methanol, ethanol, 1-propanol, 2-propanol, 2-butanol, 2-methyl-2-propanol, alkane, toluene, ethylene glycol monoethyl ether, ethylene glycol methyl ether, propylene glycol methyl ether, diethyl ether, N-methyl pyrrolidone and tetrahydrofuran.

5. The method according to claim 4, wherein the ester is at least one selected from the group consisting of methyl acetate, ethyl formate, propyl formate, ethyl acetate and butyl acetate.

6. The method according to claim 4, wherein the alkane is at least one selected from the group consisting of n-heptane, n-hexane, n-pentane and cyclohexane.

* * * * *